(12) United States Patent  
Sanchez et al.

(10) Patent No.: US 9,298,298 B2  
(45) Date of Patent: Mar. 29, 2016

(54) WEARABLE DISPLAY INPUT SYSTEM

(71) Applicant: MICROSOFT TECHNOLOGY LICENSING, LLC, Redmond, WA (US)

(72) Inventors: Russell Sanchez, Seattle, WA (US); Cameron Brown, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 73 days.

(21) Appl. No.: 14/132,851

(22) Filed: Dec. 18, 2013

(65) Prior Publication Data

US 2015/0169120 A1 Jun. 18, 2015

(51) Int. Cl.  
G06F 3/045 (2006.01)  
G06F 3/041 (2006.01)  
G02B 27/01 (2006.01)  
G06F 3/0487 (2013.01)  
G06F 1/16 (2006.01)  
(Continued)

(52) U.S. Cl.  
CPC ............ G06F 3/0412 (2013.01); G02B 27/017 (2013.01); G06F 1/163 (2013.01); G06F 3/011 (2013.01); G06F 3/0362 (2013.01); G06F 3/0487 (2013.01); G02B 2027/014 (2013.01); G02B 2027/0178 (2013.01); G06F 2203/0339 (2013.01); G06F 2203/04106 (2013.01)

(58) Field of Classification Search  
CPC .................... G06F 3/0412; G06F 2203/04106; G06F 3/0362; G06F 3/041; G06F 3/011; G06F 2203/0339; G06F 3/0487

USPC .......................................... 345/7–9, 173–178  
See application file for complete search history.

(56) References Cited

U.S. PATENT DOCUMENTS 8,454,157 B2 6/2013 Chiang  
8,509,483 B2 8/2013 Ashok Inigo  
(Continued)

FOREIGN PATENT DOCUMENTS

EP 2587300 A1 5/2013  
WO 9832117 A1 7/1998  
(Continued)

OTHER PUBLICATIONS

Inami M., et al. "Visuo-Haptic Display Using Head-Mounted Projector", In The University of Tokyo media3@star.t.u-tokyo.ac.jp; 2000, 8 pages.

(Continued)

*Primary Examiner* — Vijay Shankar  
(74) *Attorney, Agent, or Firm* — Judy Yee; Micky Minhas

(57) ABSTRACT

Embodiments that relate to an input system for a wearable display device are disclosed. For example, in one disclosed embodiment the wearable display device comprises at least one temple arm extending from a display bridge of the device. A first touch-sensitive strip extends along a first axis on a top side of the arm. A second touch-sensitive strip extends parallel to the first touch-sensitive strip on a bottom side of the arm opposite to the top side. At least a portion of the first touch-sensitive strip and a portion of the second touch-sensitive strip overlap as viewed from a second axis. Both the first and second touch-sensitive strips are configured to generate linear contact input signals from one or more user digits sliding along the first axis, with the linear contact input signals provided to a user interface program.

20 Claims, 11 Drawing Sheets

(51) Int. Cl.
*G06F 3/01* (2006.01)
*G06F 3/0362* (2013.01)

(56) References Cited

U.S. PATENT DOCUMENTS

| | | | |
|---|---|---|---|
| 8,885,882 B1* | 11/2014 | Yin et al. | 382/103 |
| 8,976,085 B2* | 3/2015 | Olsson et al. | 345/7 |
| 2008/0062338 A1 | 3/2008 | Herzog et al. | |
| 2010/0149073 A1 | 6/2010 | Chaum et al. | |
| 2011/0194029 A1 | 8/2011 | Herrmann et al. | |
| 2011/0231757 A1 | 9/2011 | Haddick et al. | |
| 2012/0206322 A1 | 8/2012 | Osterhout et al. | |
| 2012/0262636 A1 | 10/2012 | Lin et al. | |
| 2013/0044042 A1 | 2/2013 | Olsson et al. | |
| 2013/0188080 A1 | 7/2013 | Olsson et al. | |

FOREIGN PATENT DOCUMENTS

| | | |
|---|---|---|
| WO | 2009126264 A2 | 10/2009 |
| WO | 2013136696 A1 | 9/2013 |

OTHER PUBLICATIONS

ISA European Patent Office, International Search Report and Written Opinion Issued in Patent Application No. PCT/US2014/066995, Feb. 26, 2015, 12 Pages.

* cited by examiner

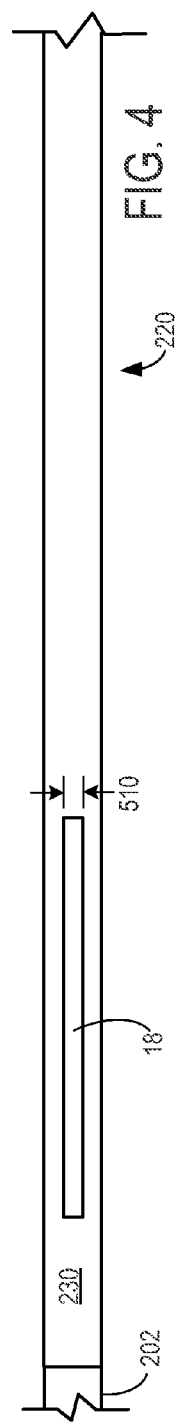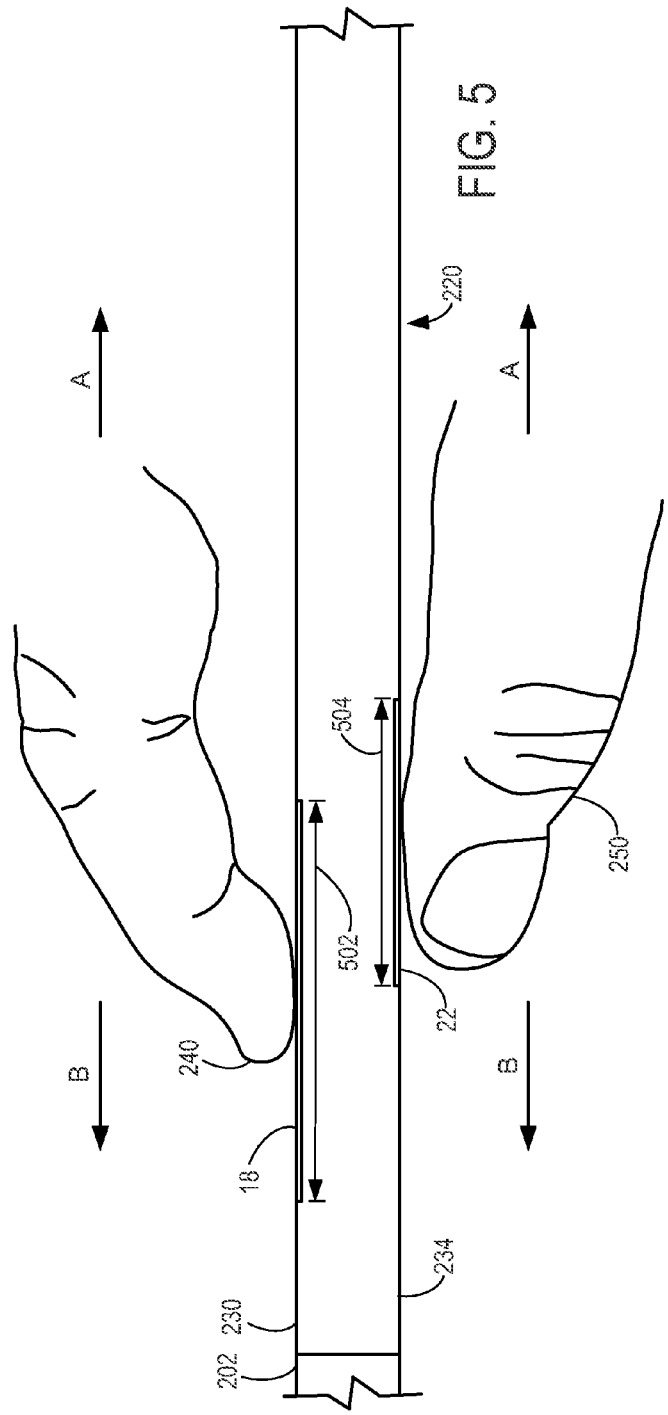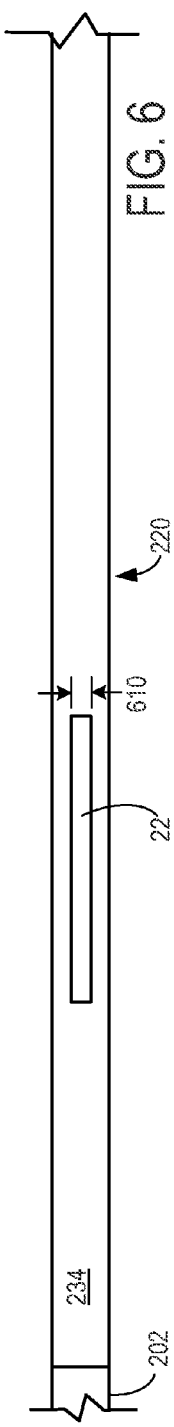

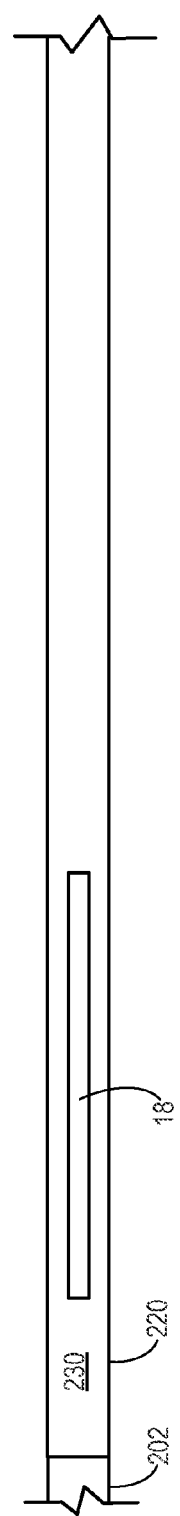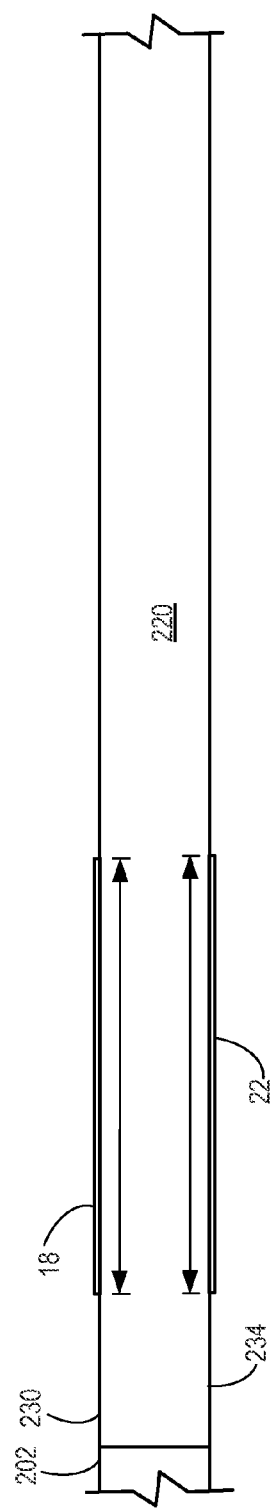

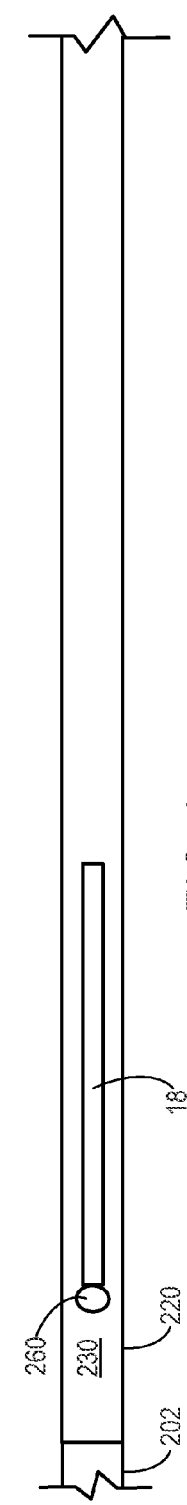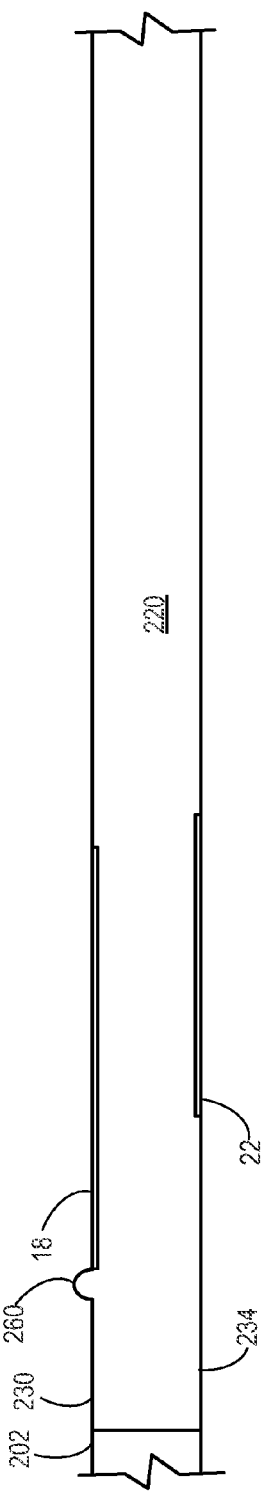

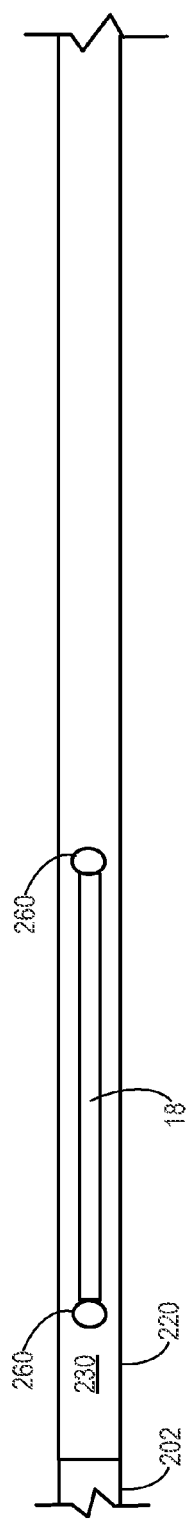
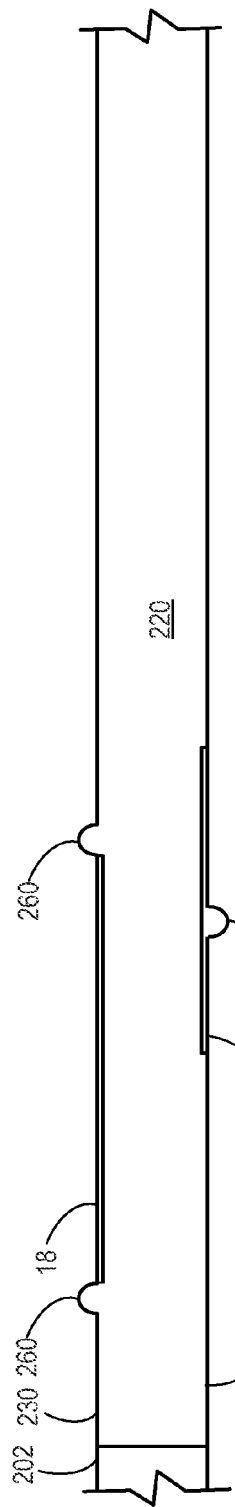

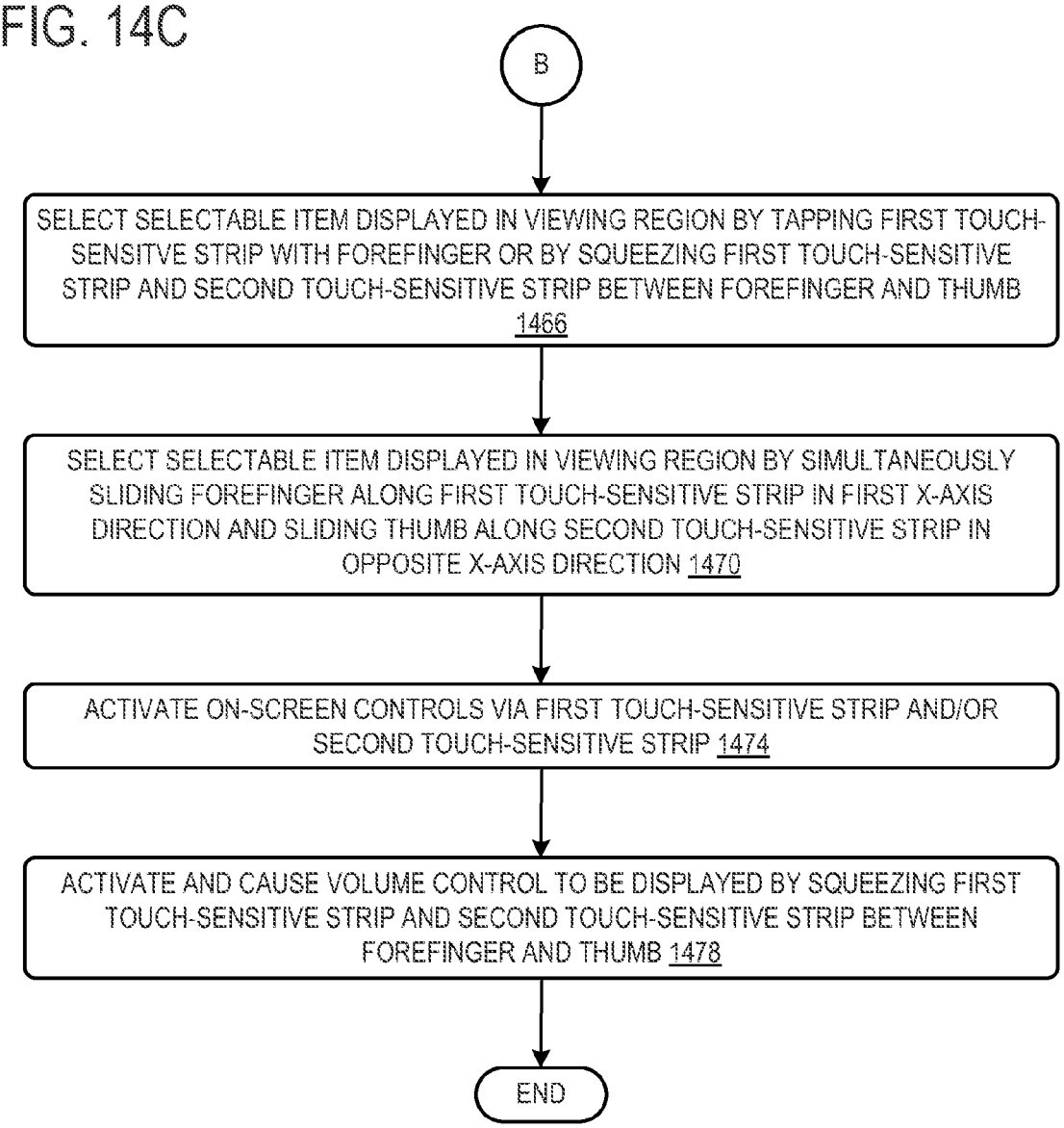

WEARABLE DISPLAY INPUT SYSTEM

BACKGROUND

To facilitate high fidelity user input and consistent user control across a wide range of experiences and applications, many mobile electronic devices utilize multi-dimensional input modalities. For example, tablets and mobile phones typically provide a touch input surface that tracks finger or stylus position and motion across a two-dimensional area. To accommodate typical human finger coordination and size, the touch sensors and corresponding input surface area in these devices are typically configured to accommodate at least 30 millimeters (mm) of finger motion in each dimension. Typically these devices are also securely supported during user input by resting on a surface or being held in the user's hand.

However, with respect to smaller form factor devices such as eyeglasses and other wearable display devices, the reduced surface area of these devices limits available input modalities. For example, the typically constrained surface area of a pair of eyeglasses makes two-dimensional touch input with human fingers challenging to incorporate. Further, because eyeglasses are typically worn somewhat loosely for comfort, some implementations of touch input functionality may cause undesirable movement of the eyeglasses and corresponding display system.

SUMMARY

Various embodiments are disclosed herein that relate to an input system for a wearable display device. For example, one disclosed embodiment provides an input system for a wearable display device that is operatively connected to a computing device. The wearable display device comprises at least one temple arm that extends from a display bridge of the device. The input system comprises a first touch-sensitive strip extending along a first axis on a top side of the temple arm, and a second touch-sensitive strip extending parallel to the first touch-sensitive strip on a bottom side of the temple arm that is opposite to the top side. At least a portion of the first touch-sensitive strip and at least a portion of the second touch-sensitive strip overlap as viewed from a second axis.

Both the first touch-sensitive strip and the second touch-sensitive strip are configured to generate linear contact input signals from one or more user digits sliding along the first axis. The linear contact input signals are provided to a user interface program that is executed by a processor of the computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a top view of a portion of a temple arm of the wearable display device of FIG. 2.

FIG. 5 is a cutaway side view of the portion of the temple arm of FIG. 4 showing a forefinger and thumb contacting touch-sensitive strips.

FIG. 6 is a bottom view of the portion of the temple arm of FIGS. 4 and 5.

FIG. 7 is a top view of a portion of a temple arm of a wearable display device according to another embodiment of the present disclosure.

FIG. 8 is a side view of the portion of the temple arm of FIG. 7.

FIG. 9 is a top view of a portion of a temple arm of a wearable display device according to another embodiment of the present disclosure.

FIG. 10 is a cutaway side view of the portion of the temple arm of FIG. 9.

FIG. 11 is a top view of a portion of a temple arm of a wearable display device according to another embodiment of the present disclosure.

FIG. 12 is a cutaway side view of the portion of the temple arm of FIG. 11.

FIGS. 14A, 14B and 14C are a flow chart of a method for controlling a user interface via multiple, parallel axes of control according to an embodiment of the present disclosure.

DETAILED DESCRIPTION

Figure 1:
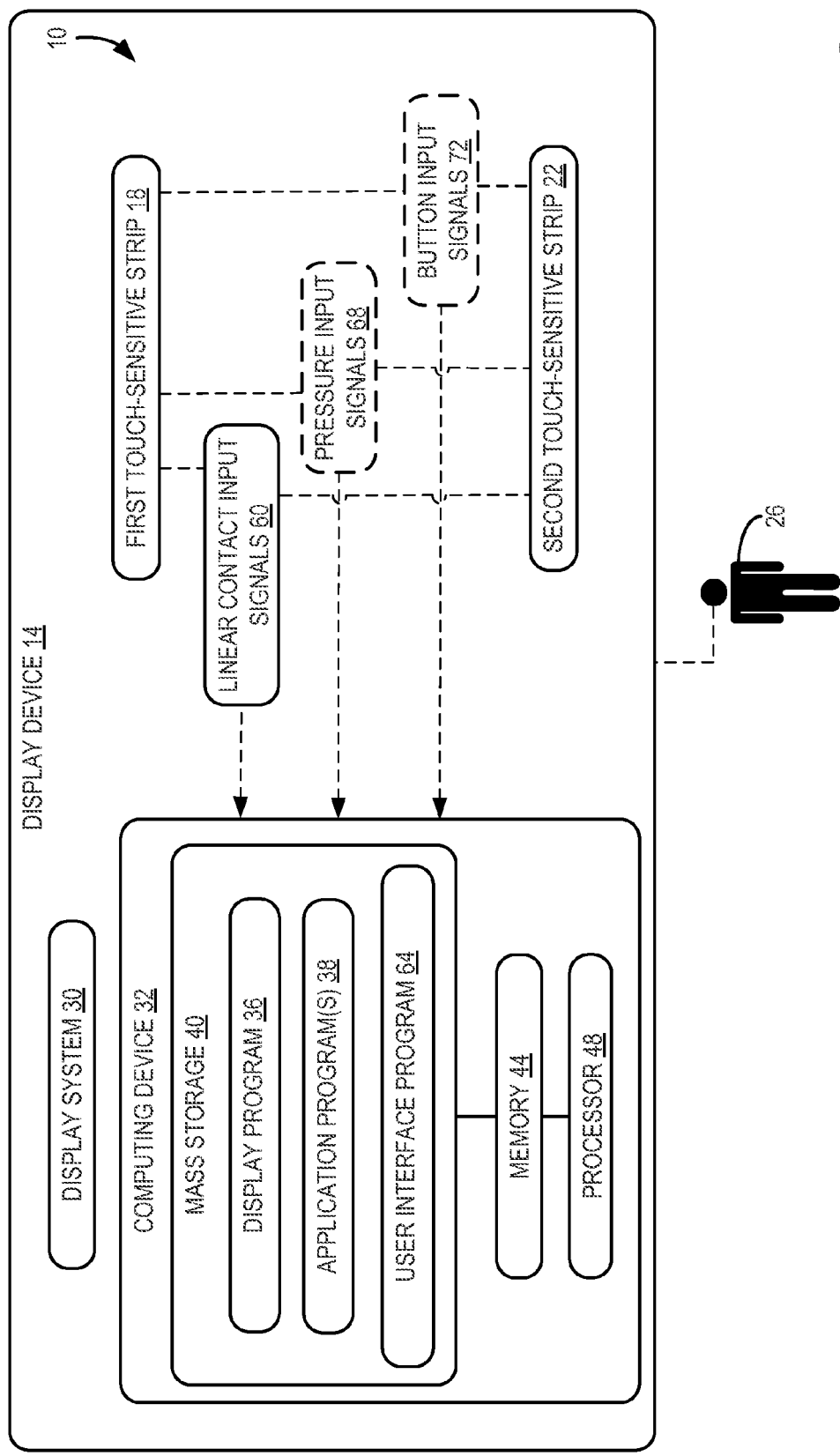
FIG. 1 is a schematic view of an input system for a wearable display device according to an embodiment of the present disclosure.
Figure 2:
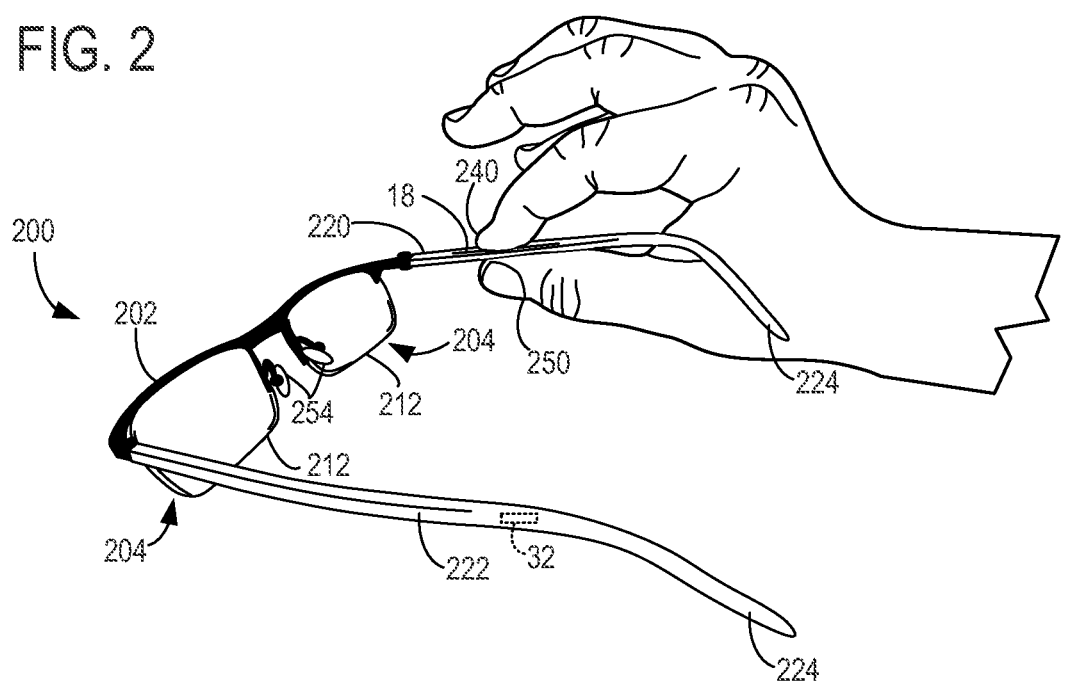
FIG. 2 is a perspective view of an example wearable display device incorporating an input system according to an embodiment of the present disclosure.
Figure 3:
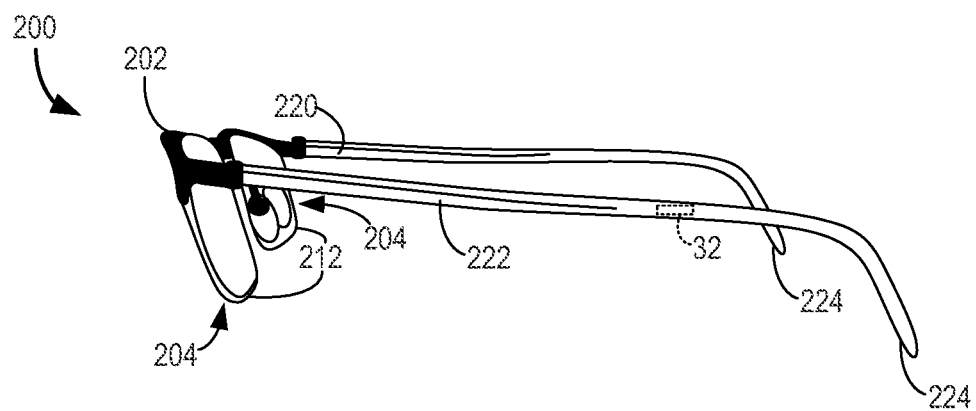
FIG. 3 is a side view of the wearable display device of FIG. 2.

FIG. 1 shows a schematic view of one embodiment of an input system 10 for a wearable display device 14, such as the eyeglasses 200 as shown in FIGS. 2 and 3 and described in more detail below. The input system 10 includes a first touch-sensitive strip 18 and a second touch-sensitive strip 22 located on an opposing surface of the wearable display device 14 (see also FIG. 5). As described in more detail below, the first touch-sensitive strip 18 and second touch-sensitive strip 22 may receive touch input from contact by one or more digits of a user 26.

The wearable display device 14 includes a display system 30 that is configured to display images for viewing by a user 26. The wearable display device 14 is also operatively connected to a computing device 32 that includes a display program 36 for controlling the display system 30. The display program 36 may be stored in mass storage 40 of the computing device 32, loaded into memory 44 and executed by a processor 48 of the computing device 32 to perform one or more of the methods and processes described in more detail below. The computing device 32 may also include one or more application programs 38 that also may be stored in mass storage 40 of the computing device, loaded into memory 44 and executed by the processor 48 to perform one or more particular functions.

The example illustrated in FIG. 1 shows the computing device 32 integrated into the display device 14. It will be appreciated that in other examples the computing device 32 may be a component or device that is separate from the display device 14. In these examples the computing device 32 may take the form of a mobile computing device such as a smart phone, laptop, notebook or tablet computer, desktop computing device, network computer, home entertainment computer, interactive television, gaming system, or other suitable type of computing device.

The computing device 32 may be operatively connected with the display device 14 using a wired connection, or may employ a wireless connection via WiFi, Bluetooth, or any other suitable wireless communication protocol. Additional details regarding the components and computing aspects of the computing device 32 are described in more detail below with reference to FIG. 15.

In some examples, the wearable display device 14 may comprise a head-mounted display (HMD) device that generates images creating a virtual reality or mixed reality experience. With reference now also to FIGS. 2 and 3, one example of a wearable HMD display device 14 in the form of a pair of eyeglasses 200 is provided. In this example the eyeglasses 200 include transparent displays 204 that are supported in front of a user's eyes by a display bridge 202. It will be appreciated that in other examples, the eyeglasses 200 may take other suitable forms in which a transparent, semi-transparent or non-transparent display is supported in front of a viewer's eye or eyes. It will also be appreciated that many other types and configurations of wearable display devices having various form factors may also be used within the scope of the present disclosure. Such wearable display devices may include, but are not limited to, wristwatches, pocket watches, bracelets, brooches, pendant necklaces, monocles, and other suitable wearable display devices.

With reference to the eyeglasses 200 shown in FIGS. 2 and 3, in this example the transparent displays 204 may be configured to visually augment an appearance of a physical environment to a user viewing the physical environment through the transparent display. For example, the appearance of the physical environment may be augmented by graphical content (e.g., one or more pixels each having a respective color and brightness) that is presented via the transparent displays 204.

The transparent displays 204 may also be configured to enable a user to view a physical, real-world object in the physical environment through one or more partially transparent pixels that are displaying a virtual object representation. In one example, the transparent displays 204 may include image-producing elements located within lenses 212 (such as, for example, a see-through Organic Light-Emitting Diode (OLED) display). As another example, the transparent displays 204 may include a light modulator on an edge of the lenses 212. In this example the lenses 212 may serve as a light guide for delivering light from the light modulator to the eyes of a user. Such a light guide may enable a user to perceive a 2D image or a 3D holographic image located within the physical environment that the user is viewing, while also allowing the user to view physical objects in the physical environment.

As noted above, the eyeglasses 200 include a first touch-sensitive strip 18 and a second touch-sensitive strip 22. The first touch-sensitive strip 18 and second touch-sensitive strip 22 may utilize, for example, capacitive touch sensing components, resistive touch sensing components, or any other suitable tactile sensing components that are sensitive to touch, pressure and/or strain. As described in more detail below, the first touch-sensitive strip 18 and second touch-sensitive strip 22 may sense one or more forms of touch input from contact by one or more digits of a user. In some examples, the eyeglasses 200 may also include one or more push buttons for receiving input from a user.

In some examples the eyeglasses 200 may also include various other sensors and related systems. For example, the eyeglasses 200 may include an optical sensor system that utilizes at least one outward facing sensor, such as an optical sensor. Outward facing sensor may detect movements within its field of view, such as gesture-based inputs or other movements performed by a user or by a person or physical object within the user's field of view. Outward facing sensor may also capture two-dimensional image information and depth information from the physical environment and physical objects within the environment. For example, outward facing sensor may include a depth camera, a visible light camera, an infrared light camera, and/or a position tracking camera.

The eyeglasses 200 may include depth sensing via one or more depth cameras. In one example, each depth camera may include left and right cameras of a stereoscopic vision system. Time-resolved images from one or more of these depth cameras may be registered to each other and/or to images from another optical sensor such as a visible spectrum camera, and may be combined to yield depth-resolved video.

In other examples a structured light depth camera may be configured to project a structured infrared illumination, and to image the illumination reflected from a scene onto which the illumination is projected. A depth map of the scene may be constructed based on spacings between adjacent features in the various regions of an imaged scene. In still other examples, a depth camera may take the form of a time-of-flight depth camera configured to project a pulsed infrared illumination onto a scene and detect the illumination reflected from the scene. It will be appreciated that any other suitable depth camera may be used within the scope of the present disclosure.

Outward facing sensor may capture images of the physical environment in which a user is situated. In one example, the display program 36 may include a 3D modeling system that uses such input to generate a virtual environment that may model the physical environment surrounding the user.

The eyeglasses 200 may also include a position sensor system that utilizes one or more motion sensors to enable position tracking and/or orientation sensing of the eyeglasses. For example, the position sensor system may be utilized to determine a head pose orientation of a user's head. In one example, position sensor system may comprise an inertial measurement unit configured as a six-axis or six-degree of freedom position sensor system. This example position sensor system may, for example, include three accelerometers and three gyroscopes to indicate or measure a change in location of the eyeglasses 200 within three-dimensional space along three orthogonal axes (e.g., x, y, z), and a change in an orientation of the eyeglasses about the three orthogonal axes (e.g., roll, pitch, yaw).

A position sensor system may also support other suitable positioning techniques, such as GPS or other global navigation systems. The eyeglasses 200 may also include one or more microphones for receiving audio and/or one or more speakers for broadcasting audio.

As noted above, the eyeglasses 200 may also include an integrated computing device 32 having a logic subsystem and a storage subsystem, as discussed in more detail below with respect to FIG. 15, that are in communication with the various sensors and systems of the eyeglasses. In other examples where the eyeglasses 200 are communicatively connected to a separate computing device, the eyeglasses may include a storage subsystem having instructions executable by a logic subsystem to receive signal inputs from the sensors and forward such inputs to the computing device (in unprocessed or processed form), and to present images to a user via the display system 30.

It will be appreciated that the eyeglasses 200 and related sensors and other components described above and illustrated in FIGS. 1-5 are provided by way of example. These examples are not intended to be limiting in any manner, as any other suitable sensors, components, and/or combination of sensors and components may be utilized. Therefore it is to be understood that the eyeglasses 200 may include additional and/or alternative sensors, cameras, microphones, input devices, output devices, etc. without departing from the scope of this disclosure.

Descriptions of example embodiments and use cases of the input system 10 and corresponding wearable display device 14 will now be provided. As shown in the embodiment illustrated in FIGS. 2 and 3, the eyeglasses 200 include a right temple arm 220 and left temple arm 222 that extend from the display bridge 202 of the eyeglasses. Each of the right temple arm 220 and left temple arm 222 includes a downwardly angled distal portion 224 that extends behind a user's ear when the eyeglasses 200 are worn. Each of the right temple arm 220 and left temple arm 222 may take the form of a beam having a rectangular cross section that may taper to a smooth rounded end at the distal portion 224. It will be appreciated that in other examples the right temple arm 220 and left temple arm 222 may have a square, round, oval, or other suitable cross sectional profile.

As noted above and with reference also to FIGS. 4-6, one or both of the right temple arm 220 and left temple arm 222 includes a first touch-sensitive strip 18 located on a top side 230 of the arm and a second touch-sensitive strip 22 located on an opposing, bottom side 234 of the arm. In the embodiment shown in FIGS. 2-6, the right temple arm 220 of the eyeglasses 200 includes a first touch-sensitive strip 18 and opposing second touch-sensitive strip 22, while the left temple arm 222 does not include a touch-sensitive strip. In other examples, the left temple arm 220 of the eyeglasses 200 may include a first touch-sensitive strip 18 and opposing second touch-sensitive strip 22, while the right temple arm 220 does not include a touch-sensitive strip. In other examples, both temple arms 220, 222 may include a first touch-sensitive strip 18 and opposing second touch-sensitive strip 22.

The first touch-sensitive strip 18 and second touch-sensitive strip 22 may receive touch input from contact by one or more user digits. As shown in FIGS. 4-6, the first touch-sensitive strip 18 extends in an X-axis direction and the second touch-sensitive strip 22 extends parallel to the first touch-sensitive strip in the X-axis direction. Additionally, a portion of the first touch-sensitive strip 18 and a portion of the second touch-sensitive strip 22 overlap as viewed from the Z-axis.

As shown in FIGS. 2 and 5, a users' forefinger 240 may touch the first touch-sensitive strip 18 and may slide over and along the first touch-sensitive strip in a positive X-axis direction as indicated by action arrow A or in a negative X-axis direction as indicated by action arrow B. With reference again to FIG. 1, such linear movement of the user's forefinger 240 along one axis of the first touch-sensitive strip may generate linear contact input signals 60 that are provided to a user interface program 64 stored in computing device 32 and executed by processor 48. As described in more detail below, such linear contact input signals 60 may be utilized by the user interface program 64 to navigate a user interface that is displayed via the display device 14.

With reference to FIGS. 2 and 5 and in a similar manner, a user's thumb 250 may touch the second touch-sensitive strip 22 and may slide over and along the second touch-sensitive strip in a positive X-axis direction or in a negative X-axis direction. Such linear movement of the user's thumb 250 along one axis of the second touch-sensitive strip 22 may also generate linear contact input signals 60 that are provided to the user interface program 64. With this configuration it will be appreciated that in some examples the forefinger 240 may slide on the first touch-sensitive strip 18 relative to the thumb 250 on the second touch-sensitive strip 22, and vice versa.

Advantageously and as described in more detail below, this configuration enables the input system 10 to provide to the user interface program 64 precision, linear contact input signals 60 generated by motion of a digit across a touch-sensitive strip. In some examples, individual linear contact input signals from the first touch-sensitive strip 18 and/or second touch-sensitive strip 22 may be provided to and utilized by the user interface program 64. In other examples, such individual linear contact input signals 60 may be utilized to determine relative motion between two digits, with such relative movement corresponding to one or more commands in the user interface program 64.

In some examples, the first touch-sensitive strip 18 and/or the second touch-sensitive strip 22 may also be configured to detect varying amounts of pressure applied by a user's digit in the Z-axis direction. In these examples, when one or more user digits presses against a touch-sensitive strip in a Z-axis direction, pressure input signals 68 are generated and provided to the user interface program 64.

For example, the first touch-sensitive strip 18 and/or the second touch-sensitive strip 22 may include a strain gauge that may measure the deflection or bend of the strip. In one example, the strain gauge may comprise a metallic foil pattern supported by an insulated flexible backing. As the first-touch-sensitive strip 18 or second touch-sensitive strip 22 is deflected and the integrated foil pattern is deformed, the foil's electrical resistance changes are measured and a corresponding pressure exerted on the strip may be determined. It will be appreciated that these pressure sensing components are provided for example purposes, and that any other suitable pressure sensing technology and components may be utilized.

In some examples, the first touch-sensitive strip 18 and the second touch-sensitive strip 22 may be single-touch-sensitive strips. Alternatively expressed, the first touch-sensitive strip 18 and the second touch-sensitive strip 22 may be configured to detect single contacts along their surface areas.

In other examples, the first touch-sensitive strip 18 and/or the second touch-sensitive strip 22 may be multi-touch-sensitive strips. Alternatively expressed, the first touch-sensitive strip 18 and/or the second touch-sensitive strip 22 may be configured to detect two or more discrete contacts along their surface areas. For example, the first touch-sensitive strip 18 may be configured to detect two contact points by two different user digits. Accordingly, in this example the first touch-sensitive strip 18 may generate two sets of linear contact input signals 60 corresponding to the two different user digits sliding along the surface of the strip.

In the example shown in FIGS. 4-6, the first touch-sensitive strip 18 has a length 502 that is greater than a length 504 of the second touch-sensitive strip 22. Advantageously, this configuration may ergonomically match a typical user hand and finger formation when gripping a temple arm 220 with the user's forefinger 240 and thumb 250. More particularly and with reference also to FIG. 2, when holding the eyeglasses 200 via a pinch-like grip between the user's forefinger 240 and thumb 250, the user may slide the forefinger along the top side 230 of the temple arm 220 with relative ease as the thumb provides countervailing support via the bottom side 234 of the arm. It will also be appreciated that when the eyeglasses 200 are worn by a user, the nose supports 254 and distal portions 224 of the temple arms may also support the eyeglasses and provide additional countervailing support for forefinger engagement with the top side 230 of an arm.

Additionally, the longer length of a human forefinger as compared to the length of a thumb is accommodated by a greater length 502 of the first touch-sensitive strip 18 as compared to the length 504 of the second touch-sensitive strip 22. Advantageously, such a configuration provides user input surfaces that correspond to the relative lengths of a user's forefinger and thumb that are likely to interact with such surfaces.

As shown in FIG. 5, the first touch-sensitive strip 18 may also extend closer to the display bridge 202 portion of the eyeglasses 200 than the second touch-sensitive strip 22. This configuration further corresponds to a natural grip positioning of a user's forefinger 240 and thumb 250 on the temple arm 220, and provides extended touch-sensitive surface area with which the forefinger may engage.

In some examples the first touch-sensitive strip 18 may have a length 502 of between approximately 25 mm and 75 mm, or between approximately 37 mm and approximately 63 mm, or approximately 50 mm. In some examples the second touch-sensitive strip 22 may have a length 504 of between approximately 25 mm and 75 mm, or between approximately 37 mm and approximately 63 mm, or approximately 50 mm. In the example of FIG. 5, the first touch-sensitive strip 18 may have a length 502 of approximately 50 mm and the second touch-sensitive strip 22 may have a length 504 of approximately 35 mm. It will also be appreciated that any suitable combination of lengths of the first touch-sensitive strip 18 and second touch-sensitive strip 22 may be utilized.

In some examples the first touch-sensitive strip 18 may have a width 510 of between approximately 1 mm and 5 mm, or between approximately 2 mm and approximately 4 mm, or approximately 3 mm. Similarly, the second touch-sensitive strip 22 may have a width 610 of between approximately 1 mm and 5 mm, or between approximately 2 mm and approximately 4 mm, or approximately 3 mm.

In the example of FIGS. 4-6, the first touch-sensitive strip 18 and the second touch-sensitive strip 22 are embedded within the temple arm 220 such that they are substantially flush with the top side 230 and bottom side 234, respectively. With reference now to FIGS. 7 and 8, in another example the first touch-sensitive strip 18 and the second touch-sensitive strip 22 protrude slightly above the top side 230 and bottom side 234, respectively, of the temple arm 220. In this configuration, the slight protrusion of the strips above the surface of the temple arm may provide a tactile landmark to guide a user's finger or thumb to an end of a strip. Additionally in this example, the first touch-sensitive strip 18 and the second touch-sensitive strip 22 have equivalent lengths and are spaced from the display bridge 202 of the eyeglasses 200 by equivalent distances.

In other examples, one or more push buttons may be provided on the top side 230 and/or bottom side 234 of the temple arm 220. In one example and with reference now to FIGS. 9 and 10, a single push button 260 may be provided on the top side 230 of the temple arm 220 adjacent to an end of the first touch-sensitive strip 18. When compressed, the push button 260 may provide a button input signal 72 to the user interface program 64. As described in more detail below, a user 26 may utilize the push button 260 alone or in combination with the first touch-sensitive strip 18 and/or second touch-sensitive strip 22 to control additional subsets of functionality of an application program 38 via the user interface program 64.

It will be appreciated that the push button 260 may take a variety of shapes and forms. In some examples, the push button 260 may be barely visible to the human eye, while also protruding above the top side 230 of the temple arm 220 by a sufficient amount to be felt by the tip of a user's forefinger 240. The button travel to activation may be any suitable distance such as, for example, 0.5 mm. The button may provide haptic feedback of activation to the user, such as through a click or vibration. Additionally, the push button 260 may provide a tactile landmark to help a user 26 locate the end of the first touch-sensitive strip 18.

In other examples, instead of or in addition to the push button 260, a second push button may be provided at the opposite end of the first touch-sensitive strip 18. In other examples and to provide a simple tactile landmark of an end of a touch-sensitive strip, instead of a push button 260 one or more non-functional protuberances may be provided at either or both ends of the touch-sensitive strip. In still other examples, one or more push buttons may be provided between the ends of the first touch-sensitive strip 18.

As noted above, in some examples one or more push buttons may be provided on the bottom side 234 of the temple arm 220. With reference now to FIGS. 11 and 12, in one example a push button 270 may be provided between the two ends of the second touch-sensitive strip 22. Additionally and as shown in FIG. 11, the bottom push button 270 may be offset in the Z-axis direction with respect to each of two push buttons 260 on the top side 230 of the temple arm 220. Advantageously and with this configuration, a user's thumb may press the bottom push button 270 in the positive Z-axis direction while the user's forefinger provides a stabilizing and opposing force on the first touch-sensitive strip 18 in the negative Z-axis direction without compressing one of the top push buttons 260.

In other examples, the push button 270 may be located at either or both ends of the second touch-sensitive strip 22. Accordingly, in these different examples one or more push buttons on the bottom side 234 of the temple arm 220 may be used individually or in conjunction with the one or more push buttons 260 on the top side 230 of the temple arm to activate and/or control additional subsets of functionality of an application program 38.

Figure 13:
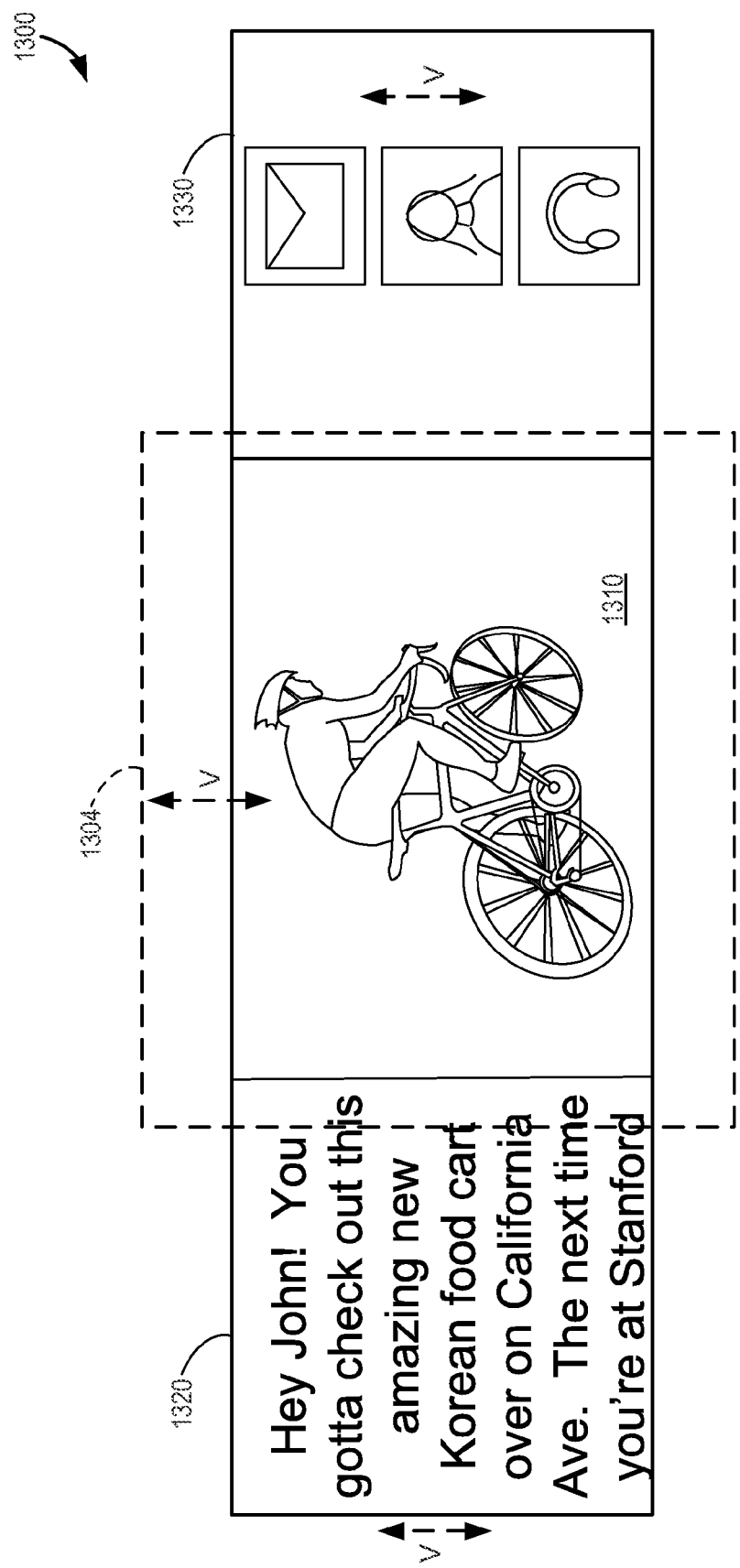
FIG. 13 is schematic view of an example user interface that may be navigated via an input system according to an embodiment of the present disclosure

With reference now to FIG. 13, examples of user interface functionality provided by the input system 10 will now be provided. As the input system 10 provides multiple, parallel axes of control via the first touch-sensitive strip 18 and second touch-sensitive strip 22, a user may conveniently utilize touch inputs along two different and parallel axes to control the display device 14, navigate an application and/or manage visualization of data.

FIG. 13 schematically illustrates one example of a user interface 1300 that may be enabled by the user interface program 64 and controlled via the input system 10. A viewing region 1304 shows the current view displayed to a user 26 by the display program 36 via the display device 14. In this example, the viewing region 1304 shows a photo 1310 displayed via a photo viewing application.

Shown to the left of the viewing region 1304 is text message region 1320 that may display text messages received by the user 26. In this example, portions of several words of the text message extend into the viewing region 1304 and thus are viewable by the user 26. In this manner, the user interface 1300 may provide a visual cue to the user 26 indicating that the text message region 1320 is adjacent to the photo viewing application in a sequence of applications and/or menus.

Shown to the right of the viewing region 1304 is a menu region 1330 that may provide a scrollable list of selectable icons that correspond to various applications that may be launched. One or more additional regions may also be provided sequentially adjacent to the text message region 1320 and menu region 1330.

In one example and with reference also to FIG. 5, a user 26 viewing the photo 1310 in the viewing region 1304 may move the text message region 1320 into the viewing region 1304 by touching the first touch-sensitive strip 18 with the user's forefinger 240 and sliding the forefinger along the X-axis in the direction of action arrow B. Similarly, the user 26 may move the menu region 1330 into the viewing region 1304 by sliding the forefinger 240 along the X-axis in the opposite direction of action arrow A.

While viewing the photo 1310 in the viewing region 1304, a user 26 may also utilize the second touch-sensitive strip 22 to manipulate the display of the photo and/or to navigate within the photo viewing application. In one example, by touching the second touch-sensitive strip 22 with the user's thumb 250 and sliding the thumb along the X-axis the direction of action arrows A and B, the user 26 may zoom into or out from the photo 1310. When the zoom factor is greater than 100%, sliding the forefinger 240 along the first touch-sensitive strip 18 may pan the displayed view to the left or right. Once in a panning mode, sliding the thumb 250 along the second touch-sensitive strip 22 may pan the displayed view up or down.

In another example, sliding the thumb along the X-axis in the direction of action arrows A and B may scroll different photos from a sequential lineup of photos through the viewing region 1304. For example, photos may be arranged sequentially and scrolled through upwardly or downwardly in a direction corresponding to action arrow V in FIG. 13.

In other examples and when the text message region 1320 is displayed in the viewing region 1304, sliding the thumb 250 on the second touch-sensitive strip 22 along the X-axis in the direction of action arrows A and B may scroll through additional text of a message and/or may scroll to a different text message in the direction corresponding to action arrow V. In other examples and when the menu region 1330 is displayed in the viewing region 1304, sliding the thumb 250 on the second touch-sensitive strip 22 along the X-axis may navigate among the different selectable application icons by, for example, selectively highlighting different icons in the direction corresponding to action arrow V.

In some examples, a user 26 may select a selectable item displayed in the viewing region 1304 by tapping the first touch-sensitive strip 18 with the user's forefinger 240 or by squeezing the first touch-sensitive strip 18 and the second touch-sensitive strip 22 between the forefinger and thumb. In other examples, a user 26 may select a selectable item displayed in the viewing region 1304 by simultaneously sliding the forefinger 240 along the first touch-sensitive strip 18 in a first X-axis direction and sliding the thumb 250 along the second touch-sensitive strip 22 in the opposite X-axis direction.

In some examples, a user 26 may activate on-screen controls via the first touch-sensitive strip 18 and/or second touch-sensitive strip 22. For example, a user may activate and cause a volume control to be displayed via the display device 14 by squeezing the first touch-sensitive strip 18 and the second touch-sensitive strip 22 between the forefinger and thumb.

It will be appreciated that the foregoing examples of utilizing the first touch-sensitive strip 18 and second touch-sensitive strip 22 to interact with a user interface displayed on a display device 14 are provided for illustrative purposes only and are not intended to be limiting in any manner. Many other variations and combinations of user touch input via the first touch-sensitive strip 18 and second touch-sensitive strip 22, and corresponding actions, commands, activations, and the like via user interface program 64, are possible.

Figure 14A:
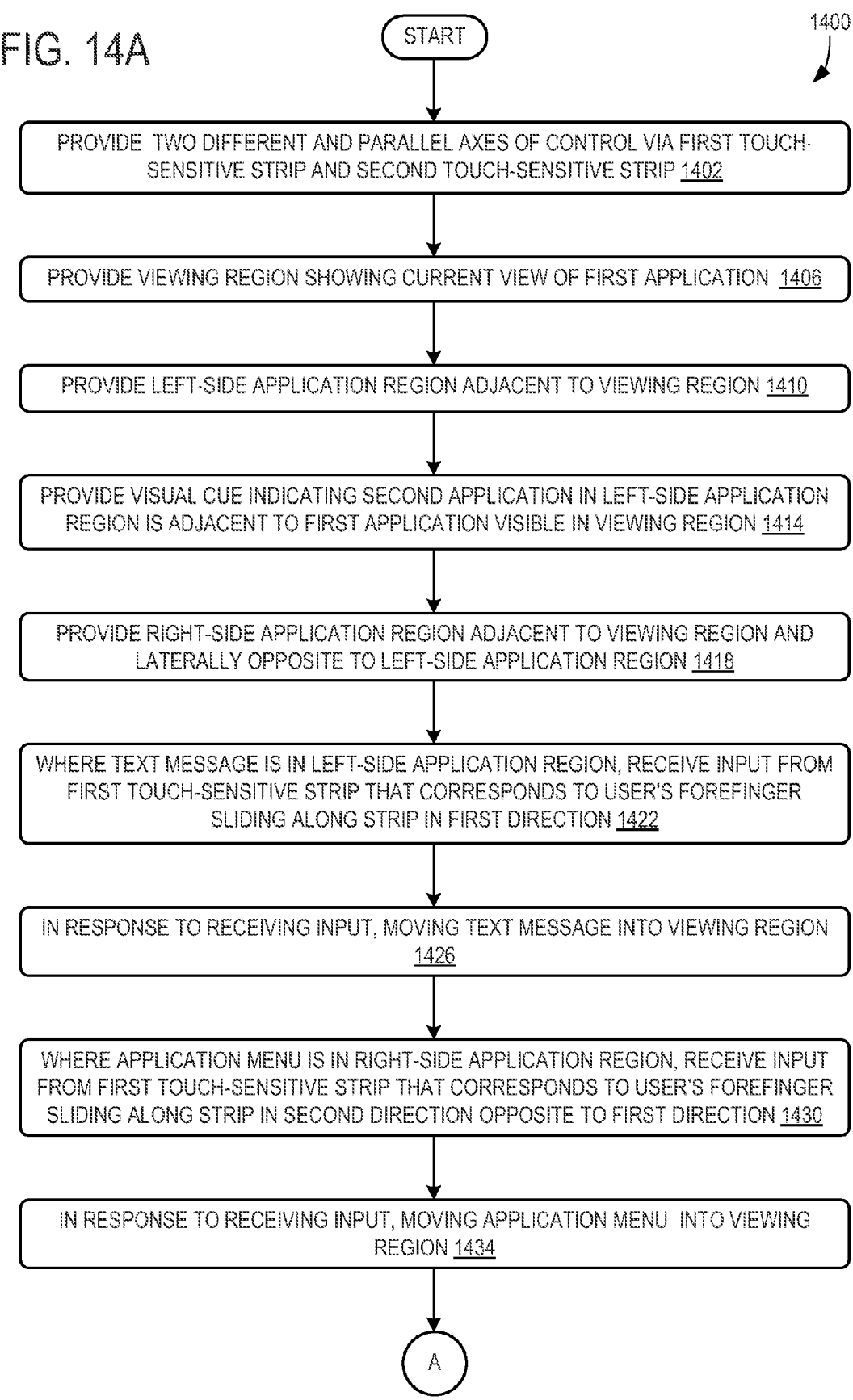
Figure 14B:
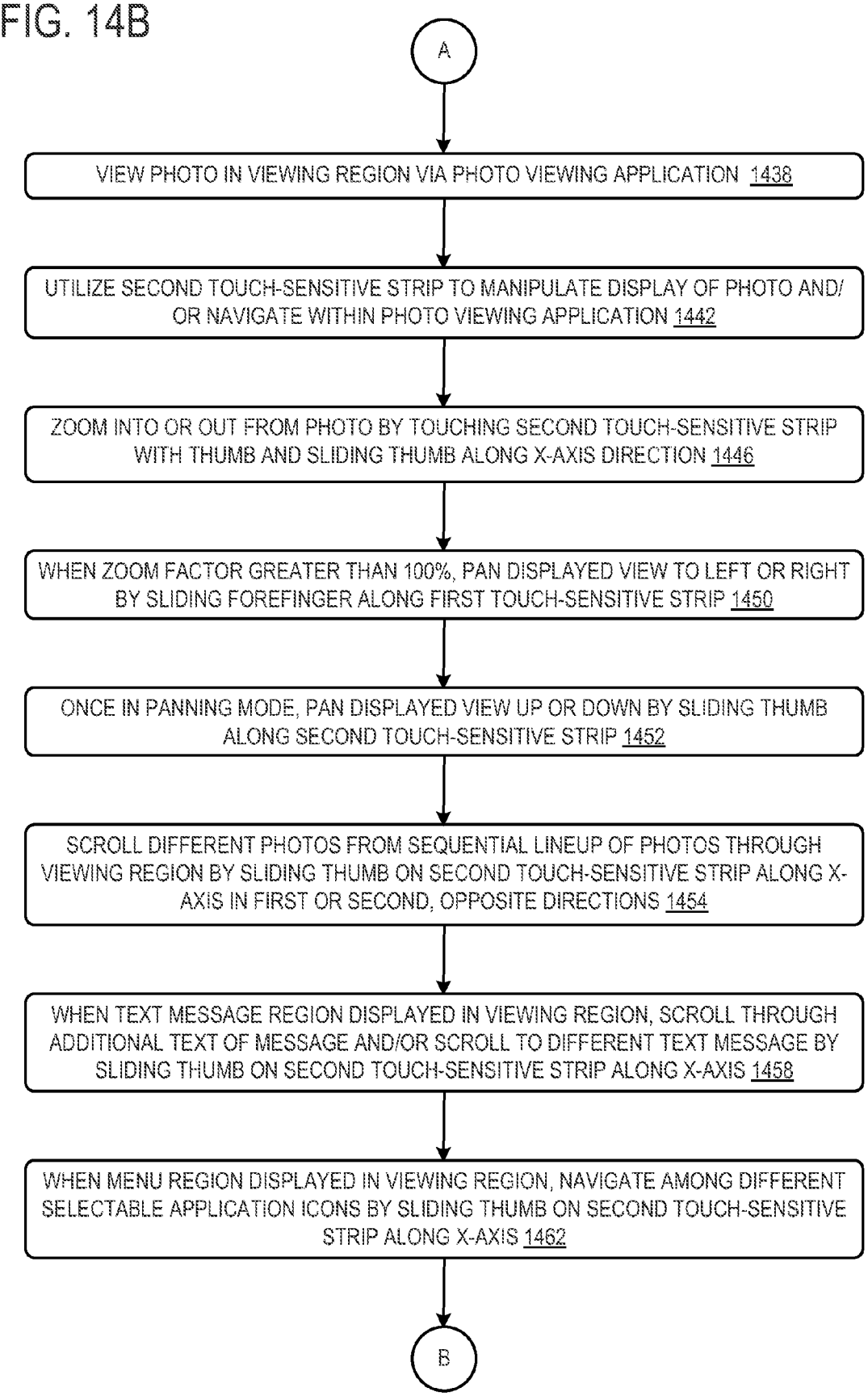

FIGS. 14A and 14B illustrate a flow chart of a method 1400 for controlling a user interface via multiple, parallel axes of control according to an embodiment of the present disclosure. The following description of method 1400 is provided with reference to the software and hardware components of the input system 10 and user interface 1300 described above and shown in FIGS. 1-13. It will be appreciated that method 1400 may also be performed in other contexts using other suitable hardware and software components.

With reference to FIG. 14A, at 1402 the method 1400 may include providing two different and parallel axes of control via a first touch-sensitive strip and a second touch-sensitive strip to control a display device, navigate an application and/or manage visualization of data via a user interface. In one example, at 1406 the method 1400 may include providing a viewing region showing a current view of a first application displayed to a user by a display program via a display device. The first application may be a photo viewing application, text message application, application menu, or any other suitable application or operating system feature.

At 1410 the method 1400 may include providing a left-side application region adjacent to the viewing region. At 1414 the method 1400 may include providing a visual cue to the user indicating that a second application in the left-side application region is adjacent to the first application visible in the viewing region. For example, where the second application is a text message application that may display text messages, portions of several words of the text message may extend into the viewing region to be viewable by the user. In this manner, the method 1400 may provide a visual cue indicating that the text message application is adjacent to the first application in a sequence of applications and/or menus.

At 1418 the method 1400 may include providing a right-side application region adjacent to a right side of the viewing region laterally opposite to the left-side application region. One or more additional regions may also be provided sequentially adjacent to the left-side application region and/or the right-side application region.

In one example where a text message region is adjacent to the viewing region, at 1422 the method 1400 may include receiving input from the first touch-sensitive strip that corresponds to a user's forefinger sliding along the strip in a first direction. At 1426 the method 1400 may include, in response to receiving this input, moving the text message region into the viewing region. Similarly, where an application menu region is adjacent to the right side of the viewing region, at 1430 the method 1400 may include receiving input from the first touch-sensitive strip that corresponds to a user's forefinger sliding along the strip in a second direction opposite to the first direction. At 1434 the method 1400 may include, in response to receiving this input, moving the application menu region into the viewing region. In some examples the application menu region may provide a scrollable list of selectable icons that correspond to various applications that may be launched.

At 1438 the method 1400 may include viewing a photo in the viewing region via the photo viewing application. At 1442 the method 1400 may include utilizing the second touch-sensitive strip to manipulate the display of the photo and/or to navigate within the photo viewing application. In one example, at 1446 the method 1400 may include zooming into or out from the photo by touching the second touch-sensitive strip with a thumb and sliding the thumb along the X-axis direction. At 1450 the method 1400 may include, when the zoom factor is greater than 100%, panning the displayed view to the left or right by sliding a forefinger along the first touch-sensitive strip. At 1452 the method 1400 may include, once in a panning mode, panning the displayed view up or down by sliding the thumb along the second touch-sensitive strip.

In another example, at 1454 the method 1400 may include scrolling different photos from a sequential lineup of photos through the viewing region by sliding the thumb along the X-axis in first or second, opposite directions. For example, photos may be arranged sequentially and scrolled through upwardly or downwardly in a direction corresponding to action arrow V in FIG. 13.

In other examples and when the text message region is displayed in the viewing region, at 1458 the method 1400 may include scrolling through additional text of a message and/or scrolling to a different text message by sliding a thumb on the second touch-sensitive strip along the X-axis. In other examples and when the menu region is displayed in the viewing region, at 1462 the method 1400 may include navigating among different selectable application icons by sliding a thumb on the second touch-sensitive strip along the X-axis. Navigating among selectable icons may comprise for example, selectively highlighting different icons.

At 1466 the method 1400 may include selecting a selectable item displayed in the viewing region by tapping the first touch-sensitive strip with a forefinger or by squeezing the first touch-sensitive strip and the second touch-sensitive strip between a forefinger and a thumb. In other examples, at 1470 the method 1400 may include selecting a selectable item displayed in the viewing region by simultaneously sliding a forefinger along the first touch-sensitive strip in a first X-axis direction and sliding a thumb along the second touch-sensitive strip in the opposite X-axis direction.

In some examples, at 1474 the method 1400 may include a activating on-screen controls via the first touch-sensitive strip and/or second touch-sensitive strip. For example, at 1478 the method 1400 may include activating and causing a volume control to be displayed via a display device by squeezing the first touch-sensitive strip and the second touch-sensitive strip between a forefinger and a thumb.

It will be appreciated that the foregoing examples of utilizing a first touch-sensitive strip and second touch-sensitive strip to interact with a user interface displayed on a display device are provided for illustrative purposes only and are not intended to be limiting in any manner. Many other variations and combinations of methods for user touch input via the first touch-sensitive strip and second touch-sensitive strip, and corresponding actions, commands, activations, and the like via a user interface program, are possible.

It will also be appreciated that method 1400 is provided by way of example and is not meant to be limiting. Therefore, it is to be understood that method 1400 may include additional and/or alternative steps than those illustrated in FIGS. 14A and 14B. Further, it is to be understood that method 1400 may be performed in any suitable order. Further still, it is to be understood that one or more steps may be omitted from method 1400 without departing from the scope of this disclosure.

Figure 15:
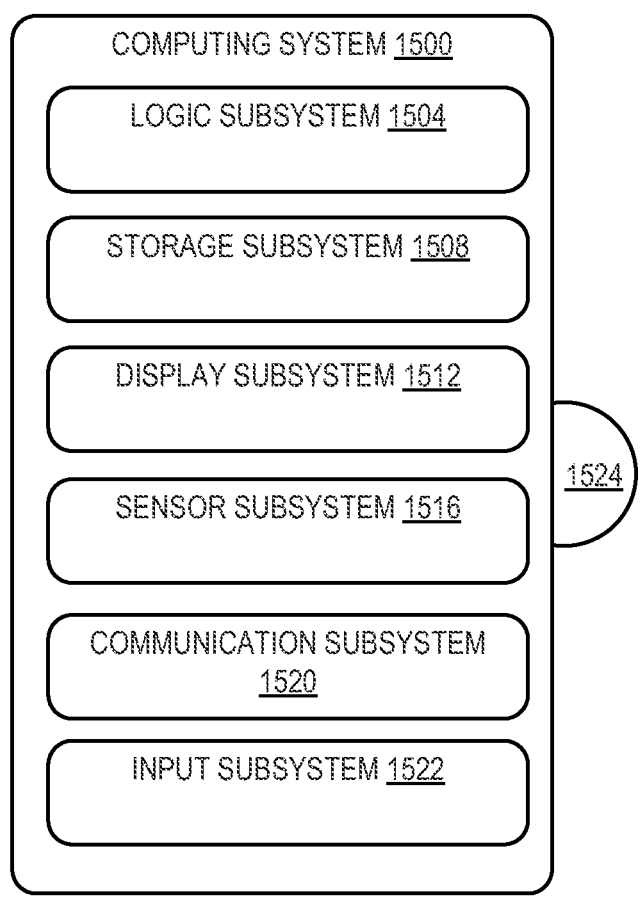
FIG. 15 is a simplified schematic illustration of an embodiment of a computing device.

FIG. 15 schematically shows a nonlimiting embodiment of a computing system 1500 that may perform one or more of the above described methods and processes. Computing device 32 may take the form of computing system 1500. Computing system 1500 is shown in simplified form, and may represent any suitable type of computing device or component. It is to be understood that virtually any computer architecture may be used without departing from the scope of this disclosure. In different embodiments, computing system 1500 may be integrated into display device 14, or may take the form of a mobile computing device such as a smart phone, laptop, notebook or tablet computer, desktop computing device, network computer, home entertainment computer, interactive television, gaming system, portable media player, gaming device, etc.

As shown in FIG. 15, computing system 1500 includes a logic subsystem 1504 and a storage subsystem 1508. Computing system 1500 may optionally include a display subsystem 1512, sensor subsystem 1516, communication subsystem 1520, input subsystem 1522 and/or other subsystems and components not shown in FIG. 15. Computing system 1500 may also include computer readable media, with the computer readable media including computer readable storage media and computer readable communication media. Further, in some embodiments the methods and processes described herein may be implemented as a computer application, computer service, computer API, computer library, and/or other computer program product in a computing system that includes one or more computers.

Logic subsystem 1504 may include one or more physical devices configured to execute one or more instructions. For example, the logic subsystem 1504 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 1504 may include one or more processors that are configured to execute software instructions. Additionally or alternatively, the logic subsystem may include one or more hardware or firmware logic machines configured to execute hardware or firmware instructions. Processors of the logic subsystem may be single core or multi-core, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 1508 may include one or more physical, persistent devices configured to hold data and/or instructions executable by the logic subsystem 1504 to implement the herein described methods and processes. When such methods and processes are implemented, the state of storage subsystem 1508 may be transformed (e.g., to hold different data).

Storage subsystem 1508 may include removable media and/or built-in devices. Storage subsystem 1504 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 1508 may include devices with one or more of the following characteristics: volatile, nonvolatile, dynamic, static, read/write, read-only, random access, sequential access, location addressable, file addressable, and content addressable.

In some embodiments, aspects of logic subsystem 1504 and storage subsystem 1508 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 15 also shows an aspect of the storage subsystem 1508 in the form of removable computer readable storage media 1524, which may be used to store data and/or instructions executable to implement the methods and processes described herein. Removable computer-readable storage media 1524 may take the form of CDs, DVDs, HD-DVDs, Blu-Ray Discs, EEPROMs, and/or floppy disks, among others.

It is to be appreciated that storage subsystem 1508 includes one or more physical, persistent devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal via computer-readable communication media.

Display subsystem 1512 may be used to present a visual representation of data held by storage subsystem 1508. As the above described methods and processes change the data held by the storage subsystem 1508, and thus transform the state of the storage subsystem, the state of the display subsystem 1512 may likewise be transformed to visually represent changes in the underlying data. The display subsystem 1512 may include one or more display devices utilizing virtually any type of technology. Such display devices may be combined with logic subsystem 1504 and/or storage subsystem 1508 in a shared enclosure, such as in the eyeglasses 200, or such display devices may be peripheral display devices. The display subsystem 1512 may include, for example, the display system 30 of display device 14.

Sensor subsystem 1516 may include one or more sensors configured to sense different physical phenomenon (e.g., touch, pressure, visible light, infrared light, sound, acceleration, orientation, position, etc.). Sensor subsystem 1516 may be configured to provide sensor data to logic subsystem 1504, for example. As described above, in some examples the sensor subsystem 1516 may comprise one or more touch-sensitive sensors configured to sense contact and/or pressure from a human digit, a stylus or other input device. Such touch-sensitive sensor data may be used to perform such tasks as navigating and controlling a user interface, activating on-screen controls, etc. In other examples sensor subsystem 1516 may include image sensors configured to acquire images facing toward and/or away from a user, motion sensors such as accelerometers that may be used to track motion of the device, and/or any other suitable sensors that may be used to perform the methods and processes described above.

Communication subsystem 1520 may be configured to communicatively couple computing system 1500 with one or more networks and/or one or more other computing devices. Communication subsystem 1520 may include wired and/or wireless communication devices compatible with one or more different communication protocols. As nonlimiting examples, the communication subsystem 1520 may be configured for communication via a wireless telephone network, a wireless local area network, a wired local area network, a wireless wide area network, a wired wide area network, etc. In some embodiments, the communication subsystem may allow computing system 1500 to send and/or receive messages to and/or from other devices via a network such as the Internet.

Input subsystem 1522 may comprise or interface with one or more sensors or user-input devices such as a game controller, gesture input detection device, voice recognizer, inertial measurement unit, keyboard, mouse, or touch screen. In some embodiments, the input subsystem 1522 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The term "program" may be used to describe an aspect of the present disclosure that is implemented to perform one or more particular functions. In some cases, such a program may be instantiated via logic subsystem 1504 executing instructions held by storage subsystem 1508. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An input system for a wearable display device that is operatively connected to a computing device, the wearable display device comprising at least one temple arm extending from a display bridge of the wearable display device, the input system comprising:
   a first touch-sensitive strip extending along a first axis on a top side of the temple arm;
   a second touch-sensitive strip extending parallel to the first touch-sensitive strip on a bottom side of the temple arm that is opposite to the top side, wherein at least a portion of the first touch-sensitive strip and at least a portion of the second touch-sensitive strip overlap as viewed from a second axis;
   wherein both the first touch-sensitive strip and the second touch-sensitive strip are configured to generate linear contact input signals from one or more user digits sliding along the first axis, the linear contact input signals provided to a user interface program executed by a processor of the computing device;
   at least two top sensors on the top side of the temple arm; and
   a bottom sensor located on the bottom side of the temple arm and offset with respect to each of the at least two top sensors, wherein each of the top sensors and the bottom sensor is configured to generate input signals from a user digit compressing the sensor, the input signals provided to the user interface program.

2. The input system of claim 1, wherein the first touch-sensitive strip is further configured to generate pressure input signals from the one or more user digits pressing against the first touch-sensitive strip, the pressure input signals provided to the user interface program.

3. The input system of claim 1, wherein at least one of the first touch-sensitive strip and the second touch-sensitive strip is a single-touch-sensitive strip.

4. The input system of claim 1, wherein at least one of the first touch-sensitive strip and the second touch-sensitive strip is a multi-touch-sensitive strip.

5. The input system of claim 1, wherein the first touch-sensitive strip has a first length that is greater than a second length of the second touch-sensitive strip.

6. The input system of claim 5, where the first touch-sensitive strip extends closer to the display bridge of the wearable display device along the first axis than the second touch-sensitive strip.

7. The input system of claim 1, wherein the first touch-sensitive strip has a length between approximately 25 mm and approximately 75 mm.

8. The input system of claim 7, wherein the first touch-sensitive strip has a width of between approximately 1 mm and approximately 5 mm.

9. The input system of claim 1, wherein the first touch-sensitive strip and the second touch-sensitive strip have equivalent lengths and are spaced from the display bridge of the wearable display device by equivalent distances along the first axis.

10. A wearable display device operatively connected to a computing device, the wearable display device comprising a display bridge and at least one temple arm extending from the display bridge, the wearable display device comprising:
    an input system, comprising:
        a first touch-sensitive strip extending along a first axis on a top side of the temple arm and configured to generate first linear contact input signals from one or more user digits sliding along the first axis, the first linear contact input signals provided to a user interface program executed by a processor of the computing device;
        a second touch-sensitive strip extending parallel to the first touch-sensitive strip on a bottom side of the temple arm that is opposite to the top side, the second touch-sensitive strip configured to generate second linear contact input signals from a user thumb sliding along the first axis, the second linear contact input signals provided to the user interface program, and wherein at least a portion of the first touch-sensitive strip and at least a portion of the second touch-sensitive strip overlap as viewed from a second axis;
        at least two top sensors located on the top side of the temple arm; and
        a bottom sensor located on the bottom side of the temple arm and offset with respect to each of the at least two top sensors, wherein each of the top sensors and the bottom sensor is configured to generate button input signals from a user digit compressing the sensor, the button input signals provided to the user interface program.

11. The wearable display device of claim 10, wherein the first touch-sensitive strip is further configured to generate pressure input signals from the one or more user digits pressing against the first touch-sensitive strip, the pressure input signals provided to the user interface program.

12. The wearable display device of claim 10, wherein at least one of the first touch-sensitive strip and the second touch-sensitive strip is a single-touch-sensitive strip.

13. The wearable display device of claim 10, wherein at least one of the first touch-sensitive strip and the second touch-sensitive strip is a multi-touch-sensitive strip.

14. The wearable display device of claim 10, wherein the first touch-sensitive strip has a first length that is greater than a second length of the second touch-sensitive strip.

15. The wearable display device of claim 14, where the first touch-sensitive strip extends closer to the display bridge of the wearable display device along the first axis than the second touch-sensitive strip.

16. The wearable display device of claim 10, wherein the first touch-sensitive strip has a length between approximately 25 mm and approximately 75 mm.

17. The wearable display device of claim 16, wherein the first touch-sensitive strip has a width of between approximately 1 mm and approximately 5 mm.

18. The wearable display device of claim 10, wherein the first touch-sensitive strip and the second touch-sensitive strip have equivalent lengths and are spaced from the display bridge of the wearable display device by equivalent distances along the first axis.

19. An input system for a wearable display device that is operatively connected to a computing device, the wearable display device comprising at least one temple arm extending from a display bridge of the wearable display device, the input system comprising:
    a first touch-sensitive strip extending along a first axis on a top side of the temple arm;
    a second touch-sensitive strip extending parallel to the first touch-sensitive strip on a bottom side of the temple arm that is opposite to the top side, wherein at least a portion of the first touch-sensitive strip and at least a portion of the second touch-sensitive strip overlap as viewed from a second axis; and
    wherein both the first touch-sensitive strip and the second touch-sensitive strip are configured to:
        generate linear contact input signals from one or more user digits sliding along the first axis, the linear contact input signals provided to a user interface program executed by a processor of the computing device; and
        generate pressure input signals from pressure applied by the one or more user digits along the second axis, the pressure input signals provided to the user interface program;
    at least two top sensors located on the top side of the temple arm; and
    a bottom sensor located on the bottom side of the temple arm and offset with respect to each of the at least two top sensors, wherein each of the top sensors and the bottom sensor is configured to generate input signals from a user digit compressing the sensor, the input signals provided to the user interface program.

20. The input system of claim 1, wherein the at least two top sensors and the bottom sensor each comprise an input button.

* * * * *